June 14, 1932.  L. C. GOAD  1,863,303
APPARATUS FOR TRIMMING FLAT PARTS
Filed March 26, 1930   3 Sheets-Sheet 1
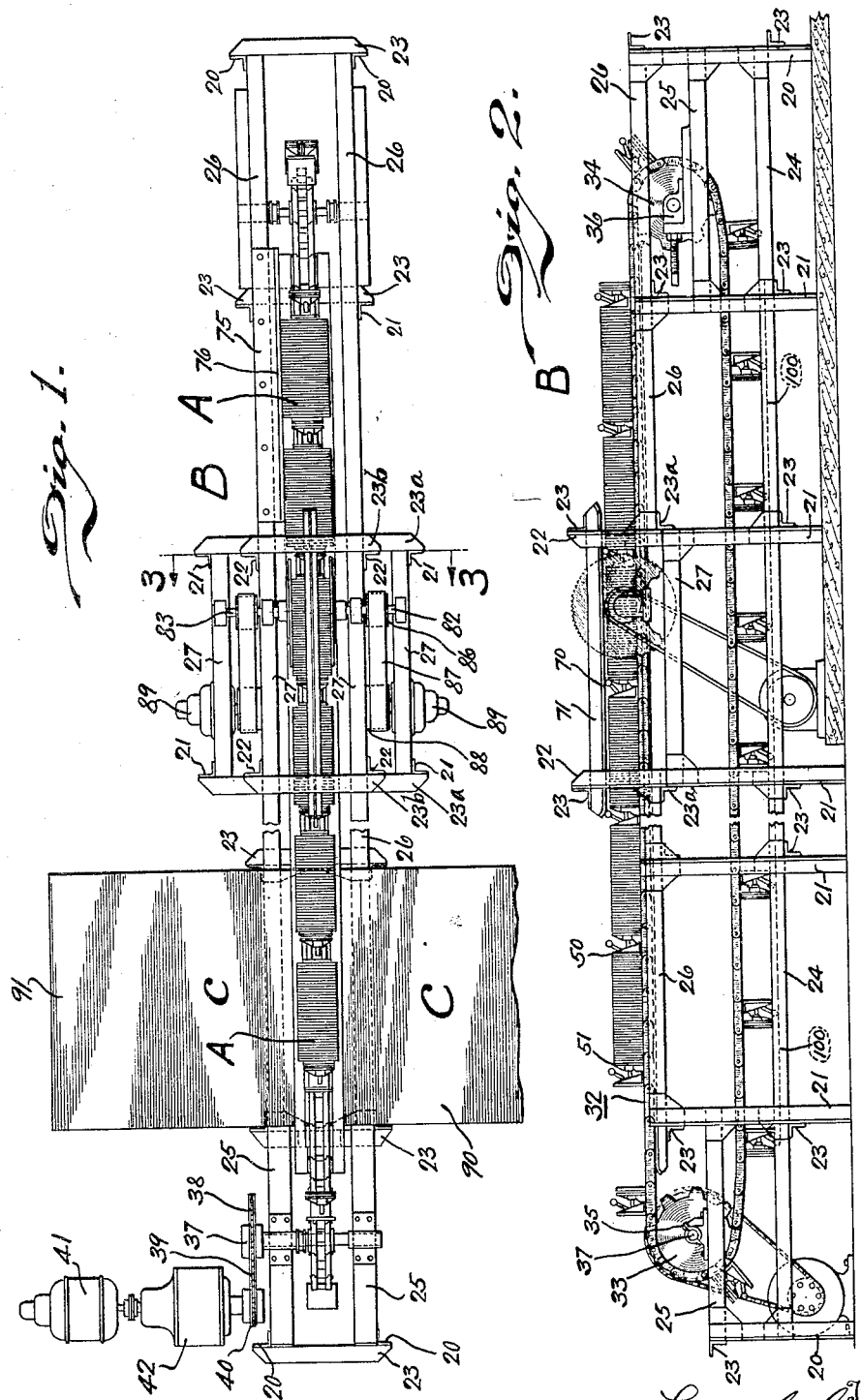

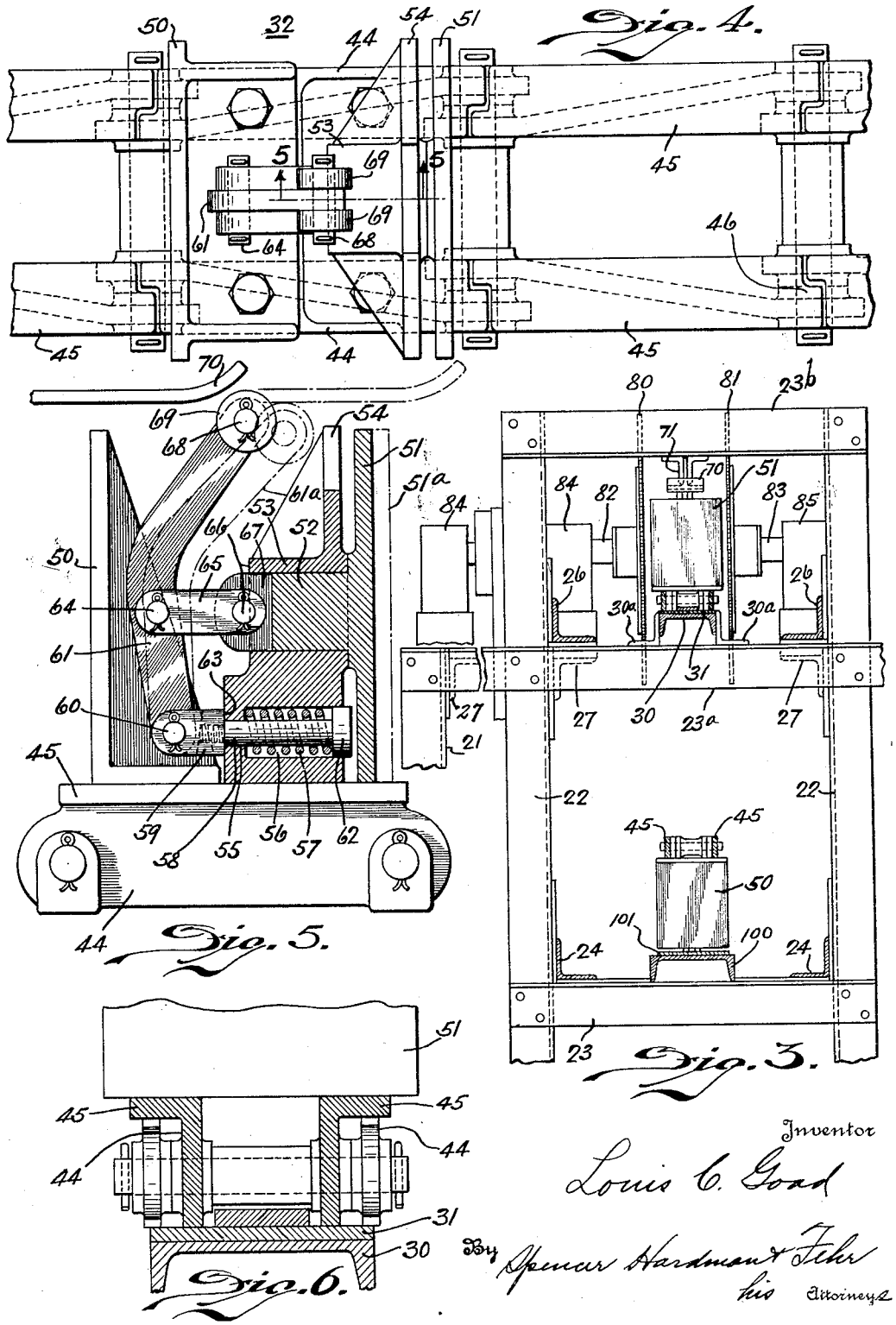

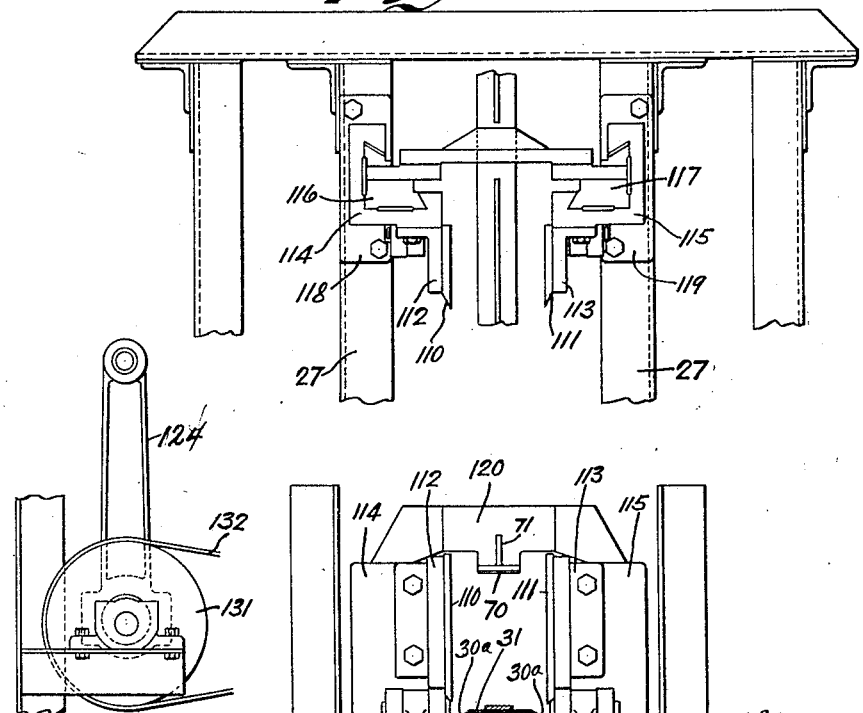
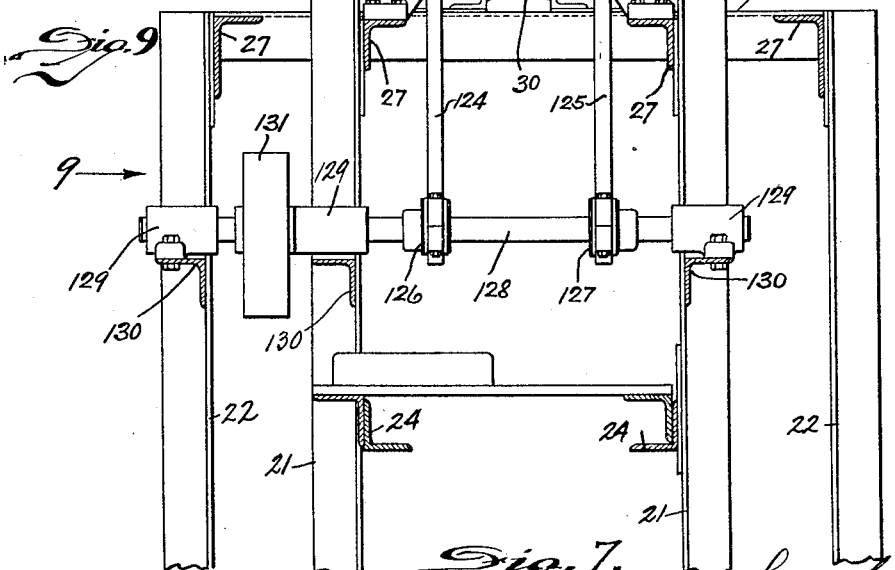

Patented June 14, 1932

1,863,303

UNITED STATES PATENT OFFICE

LOUIS C. GOAD, OF MUNCIE, INDIANA, ASSIGNOR TO DELCO-REMY CORPORATION, OF ANDERSON, INDIANA, A CORPORATION OF DELAWARE

APPARATUS FOR TRIMMING FLAT PARTS

Application filed March 26, 1930. Serial No. 439,058.

This invention relates to apparatus for trimming the edges of plates of material such as storage battery grid separators in order to provide plates of uniform dimensions.

It is one of the objects of the present invention to provide a trimming machine of rugged and durable construction which may be constructed at relatively low cost and which will be rapid and efficient in operation.

Further objects and advantages of the present invention will be apparent from the following description, reference being had to the accompanying drawings wherein a preferred embodiment of one form of the present invention is clearly shown.

In the drawings:

Figs. 1 and 2 are plan and side elevations respectively of a trimming machine constructed in accordance with the present invention.

Fig. 3 is a sectional view on the line 3—3 of Fig. 1 and is drawn to a larger scale.

Fig. 4 is a plan view of the conveyor forming a part of the trimming machine and is drawn to a still larger scale.

Fig. 5 is a side view of a portion of the conveyor and is partly in section, the section being taken on the line 5—5 of Fig. 4.

Fig. 6 is a fragmentary view on a larger scale of a part of the conveyor shown in Fig. 3.

Fig. 7 is a view similar to Fig. 3 showing a modified form of trimming device.

Fig. 8 is a plan view of the apparatus shown in Fig. 6.

Fig. 9 is a fragmentary, side view in the direction of the arrow 9 in Fig. 7.

The trimming apparatus comprises a frame fabricated from upright angle bars 20, 21 and 22 joined together by cross bars 23, 23a and 23b and supporting horizontal angle bars 24, 25, 26 and 27, all extending lengthwise of the frame. Referring to Fig. 3, the members 23a support between them an inverted channel 30 attached by short angle brackets 30a. The web of the channel supports a wear plate 31 of hardened steel which supports the upper run of a conveyor chain 32 passing around sprockets 33 and 34 rotatably supported by bearings 35 and 36 respectively. These bearings are supported by suitable brackets resting upon the frame members 25. The sprocket 33 is driven by a shaft 37 carrying a sprocket 38 connected by a chain 39 with a sprocket 40 driven by an electric motor 41 connected with the sprocket 40 by reduction gearing contained within a housing 42.

The links 44 of the conveyor chain 32 are provided with flat flanges or supporting bars 45 and the ends of these bars are notched into one another as indicated at 46 in Fig. 4 so that in effect the bars 45 provide substantially continuous spaced supporting strips or ribbons upon which rest bundles or stacks of flat pieces such as battery grid separators A. Every fourth pair of links 44 supports a stationary clamping plate 50 and a movable clamping plate 51 having a shank 52 guided for movement parallel to the bars 45 of the links by a tubular boss 53 provided by a bracket 54 attached to the links. The bracket 54 provides a hole 55 and coaxial therewith a recess 56 which receives a spring 57 surrounding a rod 58 which passes through the hole 55 and is threaded into a clevis 59 pivotally connected by pin 60 with a lever 61. The spring 57 urges the head 62 of the rod 58 toward the right thereby causing the clevis 59 normally to abut the surface 63 of the bracket 54. The lever 61 is connected by pin 64 with a link 65 connected by pin 66 with the shank 52 which has a notch 67 for receiving the link 65. The lever 61 carries at its upper end a pin 68 supporting a pair of rollers 69 adapted to engage a cam bar 70 provided by the cross flange of a T-bar 71 attached in a suitable manner to the upper cross members 23b of the frame. It will be understood that the stationary clamp 50 faces toward a movable clamp 51 spaced toward the left a distance slightly greater than the length of three links 44, and that the movable clamp 51 faces toward a fixed clamp 50 spaced toward the right. In other words the conveyor provides work holders, the bottom surfaces of which are provided by the flat bars 45 of the links and the end surfaces are provided by a pair of clamping plates, the stationary plate 50 and the movable plate 51.

In Figs. 1 and 2 letter B indicates the loading station where a horizontal row or bundle of plates A such as battery grid separators are placed between a pair of clamping plates 50, 51 and are caused to rest upon the link bars 45. The conveyor chain and the clamping plates are narrower than the desired width of the separator plates A, hence, the vertical side edges of the plates A project beyond the sides of the clamping plates 50 and 51 as well as beyond the sides of the conveyor chain. In order that the row of plates A will be located approximately centrally with respect to the conveyor so that the plates will project about the same distance beyond either side of the conveyor, one of the angle bars 26 carries an angle bar 75, the upright leg 76 of which provides a stop against which the row of plates A are located when placing the plates A between a pair of clamping plates 50, 51.

The upper run of the conveyor moves toward the left as viewed in Figs. 1, 2 and 4 and 5. Therefore, before the work holders at station B pass to the trimming means the plates A are caused to be firmly clamped between a pair of clamping plates 50 and 51. This is accomplished by the pair of rollers 69 associated with the movable clamping plate 51 engaging the camming bar 70 which causes the lever 61 to move into the position 61a shown in dot-and-dash lines in Fig. 5, thereby causing the clamp 51 to move toward the position 51a. The space between the clamping plates 50 and 51 when the plate 51 is in non-clamping position is filled with as many plates A as the space may receive without requiring the workman to wedge the plates tightly into this space. There will, of course, be some space between the plates due to the fact that the plates are not perfectly plane. The motion imparted to the lever 61 in moving it into position 61a will be more than required to take up all of the spaces between the plates A received by a work holder, therefore the lower end of the lever carrying the pin 60 may be moved clockwise relative to the pin 64, thereby compressing the spring 57 to an extent greater than normal so that the spring 57 is operative to apply yielding pressure to the clamping plate 51.

As the plates pass toward the left their opposite vertical edges are engaged by parallel disc saws 80 and 81 mounted respectively on shafts 82 and 83 supported respectively by bearings 84 and 85. These bearings are carried by the horizontal frame members 27, each of the shafts 82, 83 carrying a pulley 86 connected by a belt 87 with a pulley 88 driven by an electric motor 89. As the work holders pass further towards the left away from the trimming saws 80, 81 their rollers 69 will pass beyond the left hand end of the cam bar 70 whereupon the spring 57 will be released to permit the clamping plates 51 to move into nonclamping position. By the time the work holders have arrived at the unloading station C, the work holder clamps will be in non-clamping position so that the rows of trimmed plates A may be removed and placed on tables 90, 91.

The weight of the lower run of the conveyor is carried principally by a channel member 100 resting upon the lower cross frame members 23 as shown in Fig. 3 and carrying a wear plate 101 which receives the rollers 69 when the work holder clamps hang downwardly from the lower run of the conveyor chain as shown in Fig. 2.

A modified form of trimming apparatus is shown in Figs. 7, 8 and 9 in which illustration of the conveyor has been omitted since no modification of the conveyor is required for use with this form of trimming apparatus. Instead of the parallel disc saws 80 and 81 there are provided a pair of reciprocating knives 110 and 111 attached to angle brackets 112 and 113 respectively attached to slides 114 and 115 respectively guided for vertical movement by brackets 116 and 117 respectively having bases 118 and 119 respectively attached to frame members 27. The brackets 116 and 117 support a tie plate 120 to which the T-bar 71 providing the cam bar 70 may be attached. The slides 114 and 115 are pivotally connected by connecting rods 124 and 125 respectively with eccentrics 126 and 127 carried by shaft 128 journalled in bearings 129 attached to angles 130 and carrying a pulley 131 driven by a belt 132 connected with an electric motor (not shown). The knives 110 and 111 are caused to reciprocate rapidly in order to trim the edges of the plates A which pass between them while being clamped by the work holders of the conveyor in the manner previously described.

While the form of embodiment of the present invention as herein disclosed, constitutes a preferred form, it is to be understood that other forms might be adopted, all coming within the scope of the claims which follow.

What is claimed is as follows:

1. Apparatus for trimming flat parts such as battery grid separators comprising, in combination, spaced, parallel cutting members, a chain conveyor having its links provided with plane surfaces upon which a row of parts may be placed, certain equi-spaced links carrying two oppositely facing, relatively stationary and movable clamping plates, a lever carrying a roller and connected with the movable clamping plate, a track engageable with the roller to cause the movable plate to move into clamping position while the parts are being conveyed between the cutting members, and a spring for urging said lever toward its normal inoperative position.

2. Apparatus for trimming flat parts such as battery grid separators comprising, in combination, spaced, parallel cutting members, a chain conveyor having its links provided with plane surfaces upon which a row of parts may be placed, certain equi-spaced links carrying two oppositely facing, relatively stationary and movable clamping plates, a lever carrying a roller and connected with the movable clamping plate, a track engageable with the roller to cause the movable plate to move into clamping position while the parts are being conveyed between the cutting members, a spring for urging said lever toward its normal inoperative position, sprocket wheels about which the conveyor chain passes, said wheels being mounted with their axis horizontal, a horizontal support beneath and supporting the upper run or working portion of the conveyor chain with the clamping plates upright, and a horizontal support beneath the lower run or return portion of the conveyor chain and engageable with the rollers of the clamping plate operating levers to support the lower run with the clamping plates inverted.

In testimony whereof I hereto affix my signature.

LOUIS C. GOAD.